Oct. 29, 1957  R. E. LARSON  2,811,365
TOOL HOLDER
Filed Nov. 12, 1954
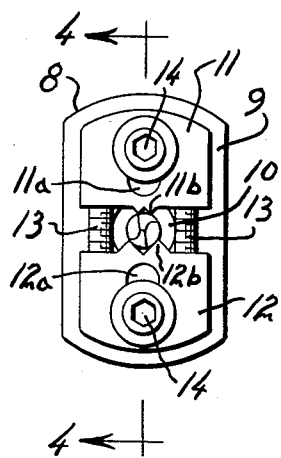
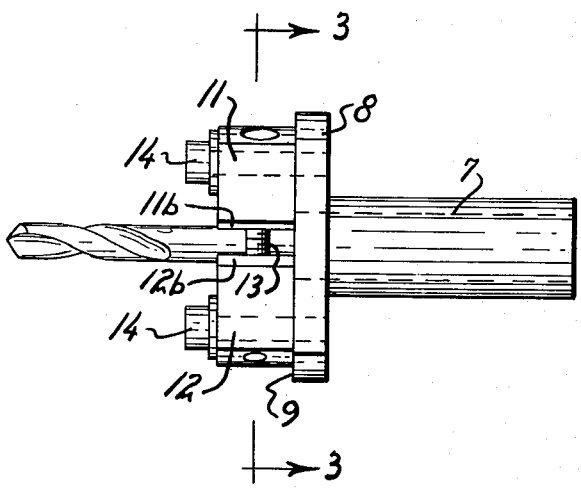
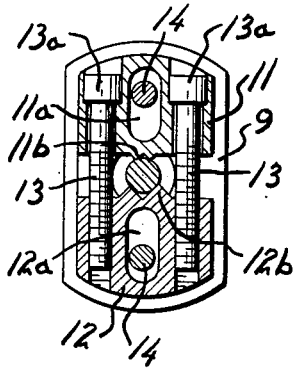
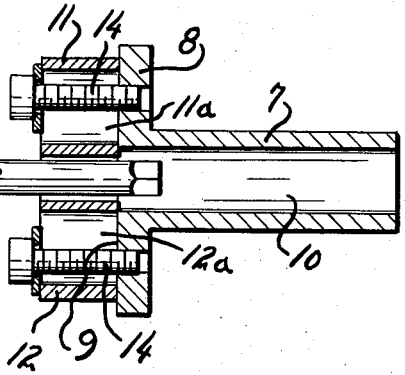
INVENTOR
ROY E. LARSON
BY Williamson, Williamson,
Schroeder & Adams
ATTORNEYS

2,811,365
TOOL HOLDER

Roy E. Larson, Mankato, Minn.

Application November 12, 1954, Serial No. 468,445

6 Claims. (Cl. 279—110)

This invention relates generally to tool holders for use with automatic screw machines and the like.

It is an object of my present invention to provide a novel and highly efficient tool holder capable of tightly clamping a tool in precisely adjusted position in an automatic screw machine or the like.

It is another object to provide a tool holder specifically designed to permit inexpensive manufacture thereof while still providing a great deal of adjustment and versatility for handling tools of different sizes and facilitating centering of said tools regardless of the size thereof.

It is a specific object of my present invention to provide a tool holder having a pair of completely separate tool holding jaw members which are independently mounted on a suitable support for adjustable movement along the face thereof and wherein the adjustment slots permit not only adjustable moving of the tool holder with the tool mounting therein but also permit the spacing between the jaws to be adjustably varied.

These and other objects and advantages of my invention will more fully appear from the following description made in connection with the accompanying drawings wherein like reference characters refer to the same or similar parts throughout the several views, and in which:

Fig. 1 is a front elevational view of my improved tool holder with a tap mounted therein;

Fig. 2 is a side elevational view thereof;

Fig. 3 is a vertical sectional view taken substantially along the line 3—3 of Fig. 2; and Fig. 4 is a vertical sectional view taken substantially along the line 4—4 of Fig. 1.

As illustrated in the accompanying drawings I provide a mounting spindle 7 adapted to be tightly clamped in an automatic screw machine or the like. The spindle 7 is rigidly fixed to a body 8 which has a generally smooth flat front surface 9 disposed at right angles to the axis of said spindle 7. The spindle and body are, of course, hollow to provide a tool receiving passage 10 axially thereof.

A pair of completely independent shiftable jaw members 11 and 12 having cooperative smooth rear faces disposed adjacent the front face of said body member 8 for adjustable sliding movement in face to face relation thereto. Said two jaw members are adjustably interconnected by elongated clamping screws 13 which are threadably received in the lower jaw member 12 and are freely journaled in the upper jaw member 11 with the heads 13a thereof recessed into the upper jaw member 12 as best shown in Fig. 3. The screws 13 are of conventional design and in the form shown are provided with a hex-shaped socket in the head thereof for applying turning leverage thereto. Each of the jaw members is adjustably mounted with respect to the body member 8 as by a similar clamping screw 14 which extends through suitable elongated slots respectively designated by the numerals 11a and 12a which are formed in the respective jaw members 11 and 12 and said screws 14 are threadably received in the body 8 as best shown in Fig. 4. Suitable washers are provided between the heads of screw member 14 and the front face of each jaw as best shown in Figs. 1, 2 and 4. The slots 11a and 12a are elongated as best shown in Figs. 3 and 4 to permit the spacing between said jaws to be adjustably varied to accommodate tools having different sized shanks and also to permit the tool to be shifted longitudinally of said slots for centering adjustment thereof after the same has been initially clamped between the jaws. Obviously if only one elongated slot were provided, the same would have to be of twice the length to provide the same amount of adjustment as is provided by applicant's cooperating pair of slots. The slots have sufficient width to provide clearance on each side of the clamping screws 14 as best shown in Fig. 3 so that when the tool has been clamped therebetween by tightening tool clamping screws 13 against the tool shank, the tool may be shifted both longitudinally of the slots 11a and 12a and also laterally or transversely thereof in order to obtain the desired centering adjustment of the tool. When the desired adjustment has been obtained, the clamping screws 14 are tightened to securely fix the tool and jaws with respect to the spindle 7 and body 8.

Each of the jaws has a pair of generally opposed spaced V-shaped projections for engaging the tool shank and obviously these projections extend the full depth of each of said jaws to provide sufficient gripping contact with the tool shank. The lower gripping points are designated by the numeral 12b and the upper gripping points are designated by the numeral 11b. It should be noted that the upper gripping points are substantially smaller and are adapted to be received between the lower gripping points to insure positive engagement with even relatively small shanked tools. The four point gripping action of these jaws extending the full depth thereof provides an extremely efficient construction which tightly clamps the tool in rigid fixed relation with respect to the body 8 and positively prevents rotation of the tool within the tool holder.

It will be seen that I have provided a novel and highly efficient tool holder particularly constructed to permit cheap and inexpensive manufacture while providing for the desired adjustment to receive tool shanks of varying sizes as well as to permit accurate centering of the tool after the same has been tightly clamped by the jaw members. The provision of two shiftable jaws which provide gripping contact for the full depth thereof, insures positive gripping of the tool and also the dual purpose slots 11a and 12a permit not only a wide variance of jaw spacings as well as providing more than adequate centering adjustment longitudinaly thereof. Sufficient transverse centering adjustment is, of course, provided by the clearance around the screws 14 as best shown in Fig. 3.

While I have shown a fixed mounting spindle as is commonly used on drill holders, a spring loaded non-releasing tap holder mounting such as is shown in Cote Patent No. 2,256,611, issued September 23, 1941, could, of course, also be provided. It is obvious, therefore, that my present tool holder could be used as a holder for drills, taps and reamers, since my invention resides solely in the tool mounting portion rather than in the attachment spindle portion, and it is obviously within the scope of my invention to provide any suitable attachment spindle for my tool.

It will, of course, be understood that various changes may be made in the form, details, arrangement, and proportions of the parts without departing from the scope of my invention which generally stated consists in the matter set forth in the appended claims.

What is claimed is:

1. A tool holder comprising a body member having a rearwardly extending mounting spindle mounted at the rear side thereof and having a smooth planar mounting surface on the front face thereof lying in a plane normal to the axis of said spindle, a pair of separate and individual jaw members having a rear face in slideable engagement with the front face of said body for limited shifting movement in face to face relation thereto in any direction normal to the axis of said spindle, clamping means adjustably interconnecting said jaws to tightly clamp the shank of a tool therebetween, each of said jaws having an elongated slot formed therethrough from the front to the rear side thereof, the longitudinal axes of said slots lying in a common plane, a pair of positioning screws extending through said elongated slots and being of slightly smaller diameter than the transverse width of said slots and being threadably received within the body member to individually clamp said jaws in the desired position, and permit centering adjustment of a tool clamped between said jaws both transversely and longitudinally of said slots.

2. A tool holder comprising a body member having a rearwardly extending mounting spindle connected at the rear side thereof and provided with a smooth planar mounting surface on the front face thereof disposed generally normal to the axis of said spindle, a pair of entirely separate and individual jaw members having a smooth rear face mounted for free sliding movement in any direction in the plane of said front face of said body to permit adjustment of the position of said jaw members to center a tool held therebetween, clamping means cooperatively associated with each of said jaw members to permit initial clamping and setting of either member individually, and clamping means securely locking said two jaw members against the shank of a tool to clamp the same therebetween.

3. The structure set forth in claim 2 and one of said jaw members having a pair of generally V-shaped clamping projections extending toward the other jaw with the points thereof disposed in spaced apart relation, the other jaw having a second pair of V-shaped clamping projections disposed in opposed relation to said first mentioned clamping projections with the point thereof spaced apart and protruding outwardly from the other jaw member toward the first mentioned jaw member and the clamping projections mounted thereon to engage the shank of a tool and positively support the same in four-point clamped position between the jaw members.

4. The structure set forth in claim 3 and one pair of said clamping projections being smaller and more closely spaced than the other to be received therein to permit tools having small shanks to be tightly clamped between the jaws.

5. The structure set forth in claim 4 and each of said clamping projections extending the full depth of each jaw member to provide four relatively long lines of contact between the jaws and the tool shank to positively prevent rotation of the shank within the tool holder.

6. A tool holder comprising a body member having an elongated spindle extending rearwardly from the rear side thereof and connected therewith, said body member having a smooth flat planar surface lying in a plane normal to the axis of said spindle and disposed on the front face thereof, and said body being provided with an opening therein axially aligned with the hollow portion of said spindle, a pair of entirely separate and individual clamping jaw members each having a rear face and slideable engagement with the front face of said body for adjustable movement in face to face relation thereto in any direction normal to the axis of said spindle, a pair of clamping screws extending through one of said jaw members and threadably inserted into the other to permit the spacing between said jaw members to be adjustably varied and permit said jaws to be tightly clamped against the shank of a tool, means on each of said jaws for clamping engagement with said tool, each of said jaw members having an elongated slot extending therethrough generally normal to the inner sliding face thereof and the longitudinal axes of said slots lying in a common plane normal to said adjustable sliding surfaces, and a pair of adjustment clamping screws respectively inserted through each of said jaw members of a smaller diameter than the shorter axis of each of said slots and being threadably received in said body member to individually clamp said jaws in the desired position on said body to permit centering adjustment of a tool clamped between said jaws both transversely and longitudinaly of said slots.

References Cited in the file of this patent

UNITED STATES PATENTS

| 2,472,040 | Brookfield | May 31, 1949 |
| 2,586,067 | Le Pree | Feb. 19, 1952 |

FOREIGN PATENTS

| 5,662 | Great Britain | Feb. 8, 1890 |
| 523,062 | France | Apr. 13, 1921 |